United States Patent
Tanimura et al.

(10) Patent No.: US 10,083,143 B2
(45) Date of Patent: Sep. 25, 2018

(54) I/O MODULE

(71) Applicant: Yokogawa Electric Corporation, Musashino-shi, Tokyo (JP)

(72) Inventors: Kazunori Tanimura, Tokyo (JP); Ikutomo Watanabe, Tokyo (JP); Mamoru Tamba, Tokyo (JP); Nobuaki Ema, Tokyo (JP); Takaaki Matsuda, Tokyo (JP)

(73) Assignee: YOKOGAWA ELECTRIC CORPORATION, Musashino-shi, Tokyo (JP)

( * ) Notice: Subject to any disclaimer, the term of this patent is extended or adjusted under 35 U.S.C. 154(b) by 778 days.

(21) Appl. No.: 14/525,770

(22) Filed: Oct. 28, 2014

(65) Prior Publication Data

US 2015/0120972 A1    Apr. 30, 2015

(30) Foreign Application Priority Data

Oct. 31, 2013   (JP) .................................. 2013-226263

(51) Int. Cl.
    G06F 13/40    (2006.01)
    G05B 19/042   (2006.01)
    G05B 19/05    (2006.01)

(52) U.S. Cl.
    CPC ....... G06F 13/409 (2013.01); G05B 19/0423 (2013.01); G05B 19/054 (2013.01);
    (Continued)

(58) Field of Classification Search
    CPC . G06F 13/409; G05B 19/0423; G05B 19/054; G05B 2219/1157;
    (Continued)

(56) References Cited

U.S. PATENT DOCUMENTS 6,144,183 A * 11/2000 Kawai .................. H02P 5/74
                                                    318/16
8,392,626 B2    3/2013 Wormmeester et al.
(Continued)

FOREIGN PATENT DOCUMENTS

EP        2492764 A2    8/2012

*Primary Examiner* — Henry Tsai
*Assistant Examiner* — John B Roche
(74) *Attorney, Agent, or Firm* — Westerman, Hattori, Daniels & Adrian, LLP

(57) ABSTRACT

An I/O module includes a base plate, a plurality of universal circuits, and an option module. The base plate includes a plurality of connection terminals. A plurality of field devices is electrically connectable to the connection terminals. The universal circuits correspond to the connection terminals. The universal circuits are provided on the base plate, and configured to perform an input of analog signals from the field device, an output of analog signals to the field device, an input of discrete signals from the field device, and an output of discrete signals to the field device. The option module is detachably provided in the base plate. The option module is provided between a first connection terminal of the connection terminals and a first universal circuit of the universal circuits. The option module includes a first circuit configured to performing transmitting and receiving of signals between the first connection terminal and the first universal circuit. The first connection terminal corresponds to the first universal circuit.

34 Claims, 6 Drawing Sheets

(52) U.S. Cl.
CPC .......... *G05B 2219/1157* (2013.01); *G05B 2219/14144* (2013.01); *G05B 2219/25296* (2013.01); *G05B 2219/31121* (2013.01)

(58) Field of Classification Search
CPC ........... G05B 2219/14144; G05B 2219/25296; G05B 2219/31121
See application file for complete search history.

(56) References Cited

U.S. PATENT DOCUMENTS

| | | | |
|---|---|---|---|
| 2002/0021558 A1 | 2/2002 | Schwarz et al. | |
| 2005/0231175 A1* | 10/2005 | Furukawa | G01R 19/16542 323/211 |
| 2009/0225062 A1* | 9/2009 | Naik | G06F 1/3203 345/204 |
| 2009/0234997 A1* | 9/2009 | Macchi | H04L 12/40006 710/106 |
| 2009/0271558 A1 | 10/2009 | Wormmeester et al. | |
| 2012/0047288 A1* | 2/2012 | Kretschmann | H05K 7/1468 710/8 |
| 2012/0078432 A1* | 3/2012 | Weatherhead | G06Q 10/06 700/295 |
| 2012/0188915 A1* | 7/2012 | Kase | G05B 19/0425 370/276 |

* cited by examiner

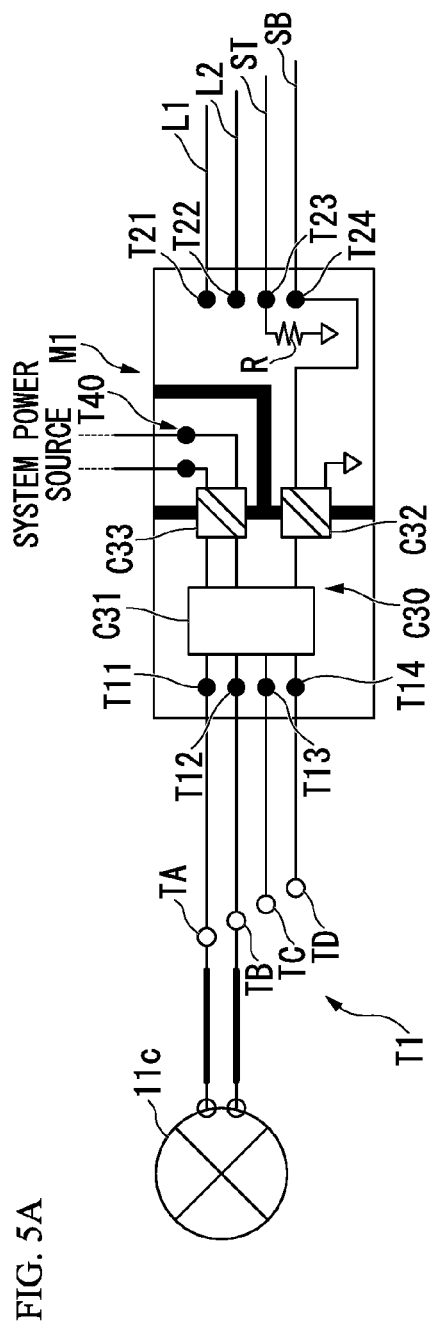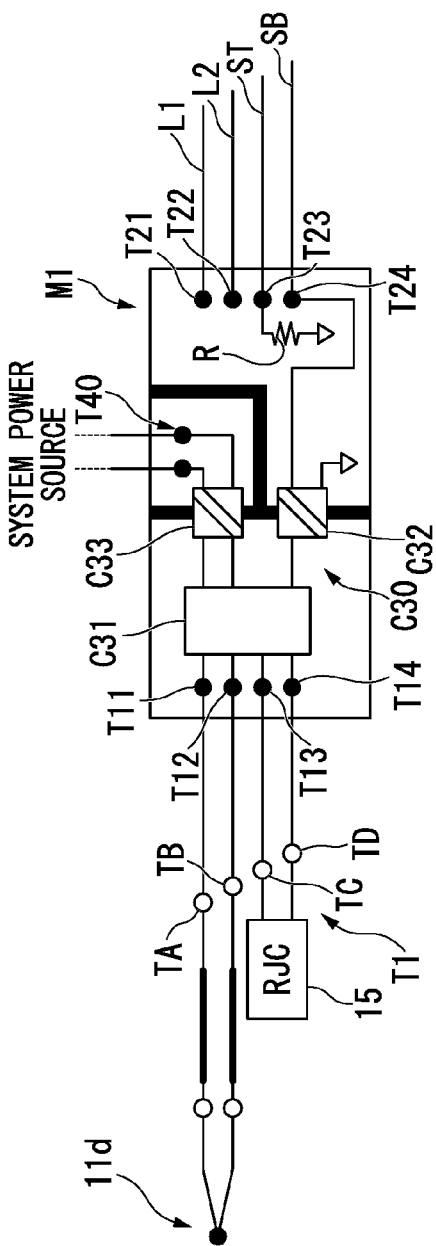
FIG. 5A
FIG. 5B

I/O MODULE

BACKGROUND OF THE INVENTION

Field of the Invention

The present invention relates to an I/O module.
Priority is claimed on Japanese Patent Application No. 2013-226263, filed Oct. 31, 2013, the contents of which are incorporated herein by reference.

Description of Related Art

In a plant or a factory or the like, a process control system controlling various state quantities (for example, pressure, temperature, and flow rate) in an industrial process has been built, and a high level of automated execution has been implemented. In such a process control system, generally, on-site devices called field devices (measuring devices, and actuators) are connected to a controller via an I/O module. The controller controls an actuator based on measured results of a measuring device (for example, sensor) to control the various state quantities.

There are various field devices used for the process control system depending on measuring targets and operation targets. The form of signals input to and output from the field devices also varies. For example, there are a field device for performing input and output of an analog signal, which is "4 to 20 mA" and the like, a field device for performing input and output of a discrete signal, which is "24V", a field device for performing input and output of a contact signal, and a field device for performing output of a thermocouple signal. Therefore, an I/O circuit is provided for each field device depending on the type of field device in the process control system in the related art.

The number of the I/O circuits provided in the process control system increases and decreases depending on the scale of the plant and the like, and there are some cases where the number is over ten thousand in a large scale plant and the like. Therefore, even if the cost of the single I/O circuit is not so high, there are some cases where the total cost of the I/O circuits in the overall process control system is considerably high. Therefore, it is necessary to decrease the number of the I/O circuits to reduce the cost.

U.S. Pat. No. 8,392,626 discloses a circuit (hereinafter, referred to as a universal circuit) capable of connecting a field device for performing input and output of the analog circuit and the digital circuit, which occupies a majority of field devices. Specifically, the universal circuit disclosed in U.S. Pat. No. 8,392,626 is capable of performing the input of the analog signal, the output of the analog signal, the input of the discrete signal, and the output of the discrete signal. When an I/O module (hereinafter, referred to as a universal I/O module) including a plurality of universal circuits described above is used, the number of type of field device connectable to a plurality of channels of one universal I/O module can be increased compared to the case in which an I/O module depending on the type of the field device is provided for each channel. Therefore, a reduction of cost is expected.

When the universal I/O module, to which the majority of field devices are connectable, is used, it is possible to decrease the total number of the I/O modules. Therefore, it is considered that a reduction of cost is possible. However, depending on the type of field device, there are still field devices which are incompatible with the universal I/O module.

For example, a field device for preforming a communication via a Foundation Fieldbus (registered trademark) does not merely transmit process values or receive parameters and is necessary to perform protocol processing. Therefore, when such field devices are connected to the universal I/O module, there are some cases where the complexity of the circuit increases, and the area, the cost, the consumed power, and the like increase. In addition, for example, in the case of a field device outputting thermocouple signals, since the voltage of the thermocouple signal is too low, the field device cannot be connected to the universal I/O module. Therefore, a dedicated I/O module compatible with low voltage is necessary. When such dedicated I/O module is added, the total number and the cost of the I/O modules increase.

SUMMARY OF THE INVENTION

One aspect of the present invention provides an I/O module, to which more multiple types of field devices than ever before are connectable.

An I/O module according to one aspect of present invention may include a base plate, a plurality of universal circuits, and an option module. The base plate may include a plurality of connection terminals. A plurality of field devices may be electrically connectable to the connection terminals. The universal circuits may correspond to the connection terminals. The universal circuits may be provided on the base plate, and configured to perform an input of analog signals from the field device, an output of analog signals to the field device, an input of discrete signals from the field device, and an output of discrete signals to the field device. The option module may be detachably provided in the base plate. The option module may be provided between a first connection terminal of the connection terminals and a first universal circuit of the universal circuits. The option module may include a first circuit configured to performing transmitting and receiving of signals between the first connection terminal and the first universal circuit. The first connection terminal may correspond to the first universal circuit.

In the I/O module described above, the first circuit may include a connection line electrically connecting the first connection terminal and the first universal circuit.

In the I/O module described above, the first circuit may be configured to connect the first connection terminal and the first universal circuit to enable transmitting and receiving of signals between the first connection terminal and the first universal circuit while electrically insulating a connection between the first connection terminal and the first universal circuit.

In the I/O module described above, the first circuit may include a photocoupler. In the I/O module described above, the first circuit may be configured to amplify or attenuate signals transmitted and received between the first connection terminal and the first universal circuit.

In the I/O module described above, the base plate may further include a signal processing circuit connected to the universal circuits and configured to process signals transmitted to and received from the field device. The option module may be connected to the first universal circuit and the signal processing circuit.

In the I/O module described above, the base plate may further include a communication bus configured to connect the attached option module and the signal processing circuit. The option module may be connected to the signal processing circuit via the communication bus. The first circuit may be configured to communicate with the signal processing circuit via the communication bus.

In the I/O module described above, the option module may further include an identification circuit configured to identify the type of the option module. The base plate may further include a signal processing circuit. The signal processing circuit may be connected to the universal circuits and be configured to process signals transmitted to and received from the field device. The base plate may further include an identification line. The identification line may be configured to connect the identification circuit provided in the attached option module and the signal processing circuit. The signal processing circuit may be configured to identify the type of option module attached to the base plate based on signals at the identification line.

In the I/O module described above, the universal circuits may be installed on an universal I/O module detachably provided in the base plate.

In the I/O module described above, the signal processing circuit and the universal circuits may be installed on an universal I/O module detachably provided on the base plate.

In the I/O module described above, at least two of the option modules attached to the base plate may be same each other. The two option modules may be connected to one of the field devices to make the option module redundant.

In the I/O module described above, the first circuit may include a first insulated circuit, a second insulated circuit, and a microprocessor connected to the connection terminals and the first and second insulated circuits.

In the I/O module described above, the first insulated circuit may be configured to connect the microprocessor and the signal processing circuit to enable transmitting and receiving of signals between the microprocessor and the signal processing circuit while electrically insulating a connection between the microprocessor and the signal processing circuit.

In the I/O module described above, the second insulated circuit may be configured to convert a source voltage of system power source into a source voltage suitable for the microprocessor while electrically insulating a connection between the microprocessor and the system power source.

In the I/O module described above, the microprocessor may be configured to perform a conversion process of communication protocol for signals input from the field device via the connection terminal, and to output the processed signals to the first insulated circuit.

In the I/O module described above, the microprocessor may be configured to perform at least one of an analog-to digital conversion process, a compensation process, and an amplification process for signals input from the field device via the connection terminal, and to output the processed signals into the first insulated circuit.

According to one aspect of the present invention, any one of a plurality of connection terminals provided on the base plate and the universal circuit corresponding to the one connection terminal are connected by the option module attached to the base plate, and the field device connected to the one connection terminal and the universal circuit are electrically connected by the first circuit provided in the option module attached to the base plate. Therefore, the one aspect of the present invention allows for the connection of more types of field devices than ever before.

According to another aspect of the present invention, in addition to the signal processing circuit connected to a plurality of universal circuits and processing signals transmitted to and received from the field device, the communication bus connecting the option module and the signal processing circuit are also provided in the base plate. Thereby, another aspect of the present invention allows for the connection with the field device without the universal circuit, and the connection of multiple types of field devices.

According to one aspect of the present invention, the identification circuit for identifying the type of the option module is provided in the option module. Therefore, another aspect of the present invention allows for the selection and automatic setting of the universal circuit and the signal processing circuit.

BRIEF DESCRIPTION OF THE DRAWINGS

FIG. 5A is a diagram showing an example of an internal circuit of an option module used for the I/O module according to the embodiment of the present invention.

FIG. 5B is a diagram showing an example of an internal circuit of an option module used for the I/O module according to the embodiment of the present invention.

DETAILED DESCRIPTION OF THE INVENTION

Hereinafter, an I/O module according to an embodiment of the present invention will be described in detail, with references made to the drawings.

[Process Control System]

Figure 1:
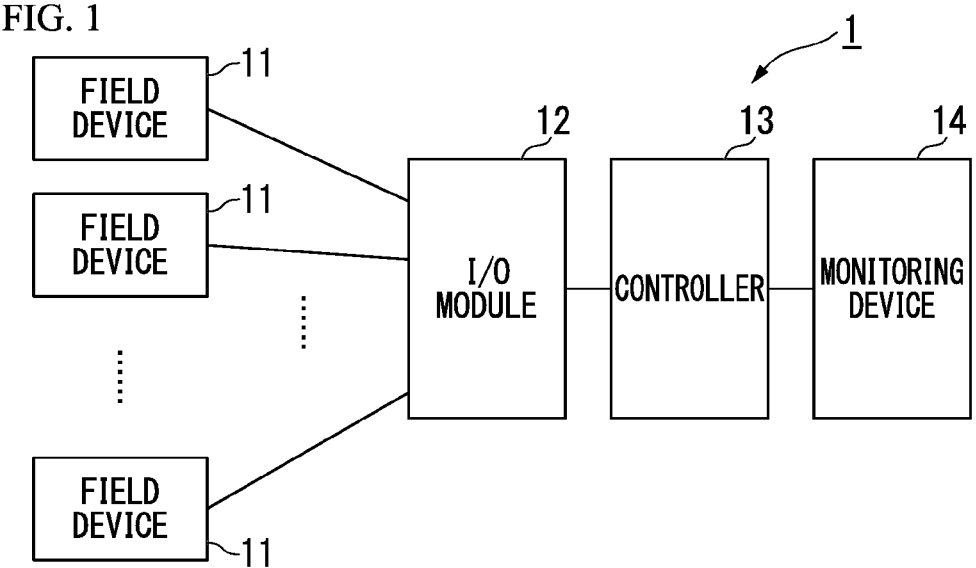
FIG. 1 is a block diagram showing an example of the overall constitution of a process control system using an I/O module according to an embodiment of the present invention.

FIG. 1 is a block diagram showing an example of the overall constitution of a process control system using an I/O module according to an embodiment of the present invention. A process control system 1 shown in FIG. 1 includes a plurality of field devices 11, an I/O module 12, a controller 13, and a monitoring device 14. The controller 13 controls the field device 11 via the I/O module 12 under the monitoring of the monitoring device 14 to control an industrial process implemented in a plant or a factory or the like.

A plurality of I/O modules 12, to which a plurality of field devices 11 is connected, is connected to the controller 13. In order to simplify the drawing, only one I/O module 12 is shown in FIG. 1. A line concentration device referred to as a junction box or a marshaling may be provided between the field device 11 and the I/O module 12.

The field device 11 is installed on site, for example, a plant or a factory, and performs at least one of measuring and operation of a target required for the control of an industrial process. Specifically, the field device 11 includes, for example, a sensor device such as a flow gauge or temperature sensor, a valve device such as a flow rate control valve or open and close value, an actuator device such as a fan or motor, an imaging device such as a camera or video for taking an image of a target or the situation in a plant, an acoustic device such as a microphone or speaker for collecting abnormal noise or the like in a plant or emitting a warning sound or the like, a position detection device for outputting position information of each device, and other devices.

The I/O module 12 is provided between the field device 11 and the controller 13. The plurality of field devices 11 is connectable to the I/O module 12. The I/O module 12 is for processing signals input and output between the connected field device 11 and the controller 13. It may be said that the I/O module 12 is for connecting the plurality of field devices 11 to the controller 13, and is for relaying signals output from the field devices 11 to the controller 13 and signals output from the controller 13 to the field devices 11. The details of the I/O module 12 will be described later The controller 13 controls the field device 11 under the monitoring of the monitoring device 14. Specifically, the controller 13 collects measured data from one field device 11 (for example, sensor device), calculates control data for controlling the field device 11 (for example, valve device), and send the control data to another field device 11 (for example, valve device).

The monitoring device 14 is operated by an operator in, for example, a plant, and is used for the monitoring of the process. Specifically, the monitoring device 14 acquires the input and output data of the field device 11 from the controller 13 and displays the data. The monitoring device 14 operates the field device 11 based on the instructions input by the operator as needed.

[I/O Module]

Figure 2:
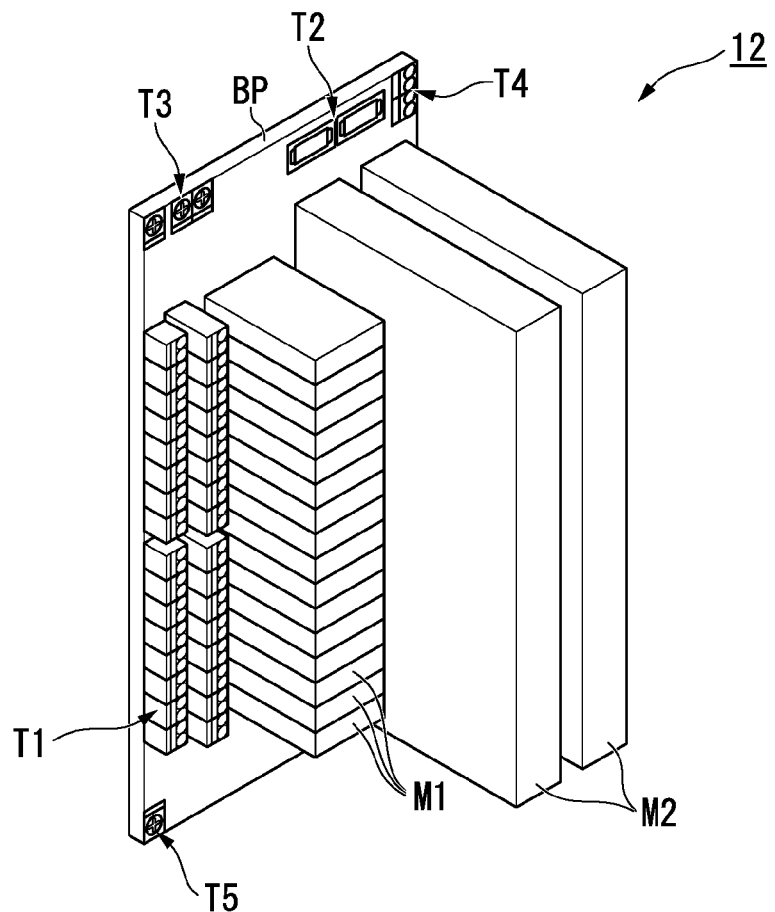
FIG. 2 is a perspective diagram showing the outer appearance of the I/O module according to the embodiment of the present invention.

FIG. 2 is a perspective diagram showing the outer appearance of the I/O module according to the embodiment of the present invention. As shown in FIG. 2, the I/O module 12 includes a base plate BP, an option module M1, and a universal I/O module M2. In the I/O module 12 shown in FIG. 2, sixteen option modules M1 and two universal I/O modules M2 are attachable to the base plate BP. The maximum number of the option modules M1, which are attachable to the base plate BP, may be fewer or greater sixteen. One universal I/O module, or universal I/O modules equal to or greater than three may be attached to the base plate BP.

Figure 3:
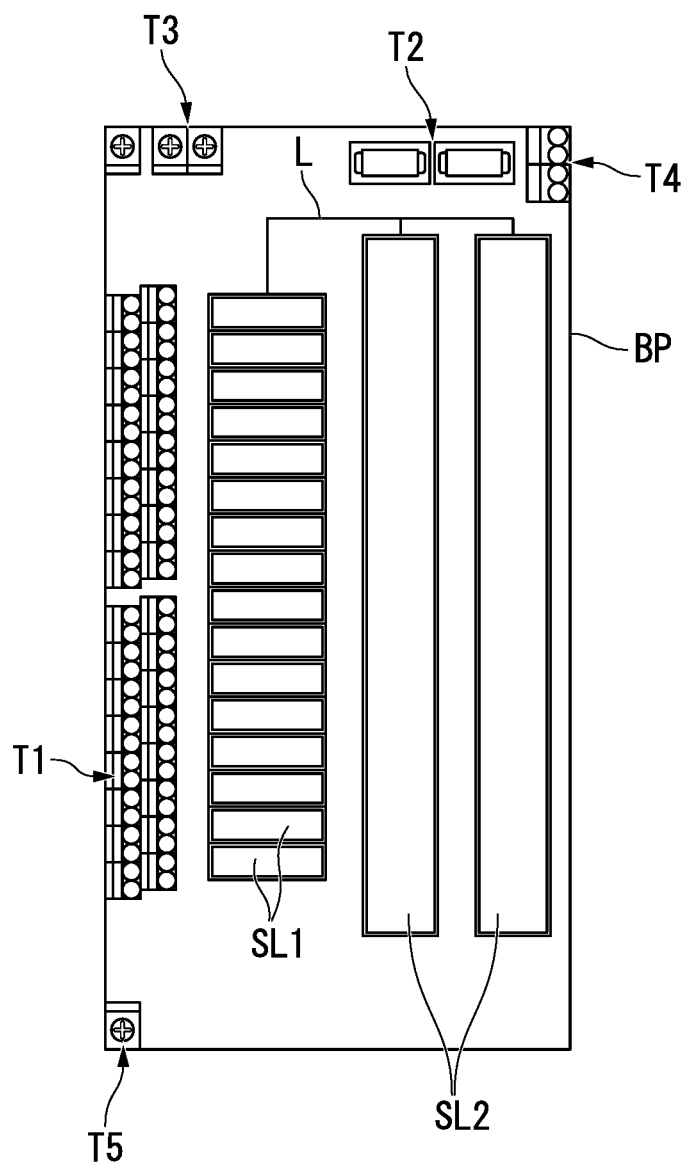
FIG. 3 is a front diagram showing a base plate included in the I/O module according to the embodiment of the present invention.

The option module M1 and the universal I/O module M2 are attached to the base plate BP. The base plate BP is a back board of rectangular plate. In the base plate BP, for example, lines, which electrically connect the option module M1 and the universal I/O module M2, are formed. FIG. 3 is a front diagram showing a base plate included in the I/O module according to the embodiment of the present invention. As shown in FIG. 3, the base plate BP includes sixteen option slots SL1 (first slot), two universal-slots SL2 (second slot), a plurality of connection terminals T1, an I/O bus connection terminal T2, an external power source connection terminal T3, a system power source connection terminal T4, and a ground connection terminal T5, and the like.

The option module M1 is attached to the option slot SL1. The option slots SL1 are arranged along the longitudinal direction of the base plate BP between the universal-slots SL2 and the connection terminals T1. Not shown in the figure, the configurations of terminals provided in the option slots SL1 (the terminal connected to a terminal of option module M1) are same each other for all of the option slots SL1. This enables an arbitrary option module M1 to be attached to an arbitrary option slot SL1.

The universal I/O module M2 is attached to the universal-slot SL2. The two universal-slots SL2 are arranged along to the short direction of the base plate BP. Each of the two universal-slots SL2 is arranged on one side of the option slot SL1 along to the longitudinal direction of the base plate BP. Specifically, the option slot SL1 includes a first side and a second side, which is opposite to the first side, along to the longitudinal direction of the base plate BP. The universal-slots SL2 is arranged on the first side, while the connection terminal T1 is arranged on the second side. As with the case of the option slots SL1, the configuration of terminal provided in one universal-slot SL2 (the terminal connected to a terminal of universal I/O module M2) is same as that of the other universal-slot SL2.

Each option slot SL1 is electrically connected to both two universal-slots SL2. Since the figure would be complex when all of the lines, which connect the option slot SL1 and the universal-slot SL2, are shown, the line, which connects the option slot SL1 and the universal-slot SL2, is shown in FIG. 3 as a line L. The details of the line, which connects the option slot SL1 (the option module M1) and the universal-slot SL2 (the universal I/O module M2), will be described later.

The field device 11 is connected to the connection terminal T1. Each connection terminal T1 is provided to correspond to each option slot SL1 (in other words, the option slot SL1 is provided to correspond to the connection terminal T1). An example, in which the total number of the connection terminals T1 provided in the base plate BP is 64 and four connection terminals T1 for each option slot SL1 are provided, is shown in FIG. 3. Sixteen field devices 11, the number of which is equal to that of the option modules SL1, are attachable to the base plate BP shown in FIG. 3. In FIG. 3, in order to avoid the figure being complicated, a line provided in the base plate BP, which connects the option slot SL1 and the connection terminal T1 is also omitted.

The I/O bus connection terminal T2 is for connecting the universal-slot SL2 to an external I/O bus (the controller 13 is connected to the bus). In FIG. 3, in order to avoid the figure being complicated, a line provided in the base plate BP, which connects the universal-slot SL2 and the I/O bus connection terminal T2, is also omitted. An external power source and a system power source, which supply electrical power required for the operations of the I/O module 12, are connected to the external power source connection terminal T3 and the system power source connection terminal T4, respectively. The ground connection terminal T5 is connected to a ground, which defines the reference potential of the I/O module 12.

The option module M1 is detachably provided to the option slot SL1 provided in the base plate BP. The option module M1 enables various field devices 11 to be connected to the universal I/O module M2. The option module M1 has a cuboid shape. A circuit required to connect the field device 11 to the universal I/O module M2 is provided in the internal of option module M1.

The option module M1 has a constant configuration regardless of the kind of circuit provided thereinside. The configuration of a terminal (the terminal connected to the terminal of option slot SL1), which is not shown in the figure and provided in each option module M1, is same for the option modules M1. This enables an arbitrary option module M1 to be connected to an arbitrary option slot SL1.

Figure 4A:
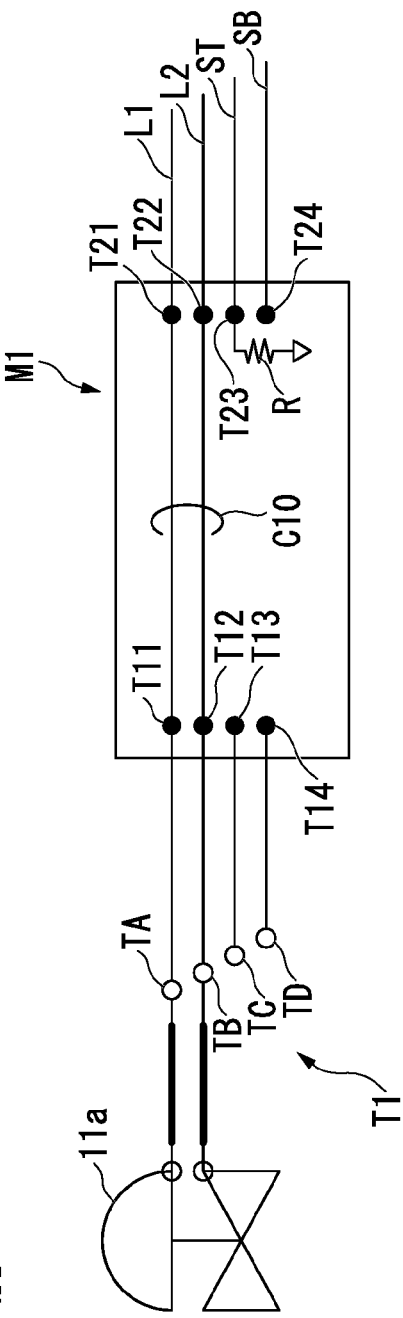
FIG. 4A is a diagram showing an example of an internal circuit of an option module used for the I/O module according to the embodiment of the present invention.
Figure 4B:
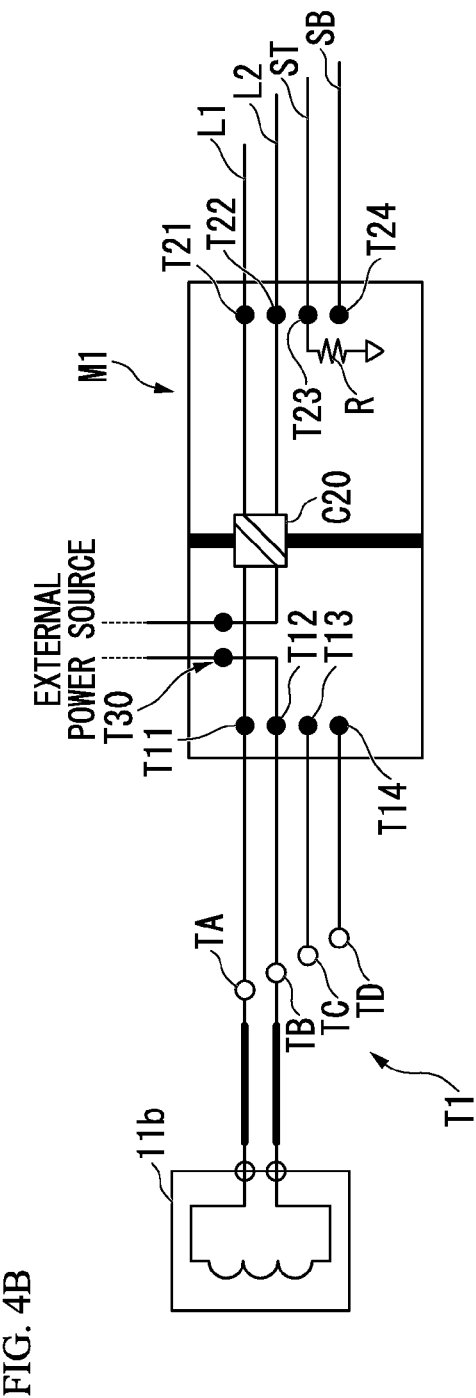
FIG. 4B is a diagram showing an example of an internal circuit of an option module used for the I/O module according to the embodiment of the present invention.

FIGS. 4A, 4B, 5A and 5B are diagrams showing an example of an internal circuit of an option module used for the I/O module according to the embodiment of the present invention. FIGS. 4A and 4B are diagrams showing an example of an internal circuit of an option module not including a microprocessor, while FIGS. 5A and 5B are diagrams showing an example of an internal circuit of an option module including a microprocessor. Hereinafter, first, the common constitution of the option module M1 will be described, then, the specific constitution depending on the kind of option module M1 will be described.

As shown in FIGS. 4A, 4B, 5A and 5B, the option module M1 includes four terminals T11 to T14 connected to the connection terminal T1 provided in the base plate BP, and four terminals T21 to T24 connected to the universal I/O module M2. As shown in FIGS. 4A and 4B, and 5A and 5B, the connection terminals T1, which are connected to the four terminals T11, T12, T13, and T14 of the option modules M1, are referred to as connection terminals TA, TB, TC, and TD, respectively.

As shown in FIGS. 4A, 4B, 5A and 5B, a connection line L1, a connection line L2, a status line ST (identification line), and a communication bus SB performing a serial communication are connected to the four terminals T21, T22, T23, and T24 of the option modules M1, respectively. These lines connect the option slot SL1 and the universal I/O module M2. The communication bus SB may be a dedicated serial bus or a versatile serial bus.

As shown in FIGS. 4A, 4B, 5A and 5B, the option module M1 includes an identification resistance R (identification circuit) for identifying the kind of module itself. The identification resistance R has different resistance value in each option module M1. One end of the identification resistance R is connected to the terminal T23 (the terminal connected to the status line ST), and the other end of the identification resistance R is grounded. The identification resistance R is used when a signal processing circuit 22 provided in the universal I/O module M2 (refer to FIG. 6; the details of the signal processing circuit 22 will be described later) identifies the option module M1.

The option module M1 shown in FIG. 4A is one, to which a valve device 11a is connected. A circuit C10 (first circuit), which includes a connection line connecting the terminal T11 and the terminal T21 and a connection line connecting the terminal T12 and the terminal T22, is provided in the option module M1 shown in FIG. 4A. The valve device 11a is connected to the connection terminals TA and TB. Therefore, it may be said that the circuit C10 provided in the option module M1 shown in FIG. 4A is for electrically connecting the valve device 11a to the connection lines L1 and L2. In FIG. 4A, the example in which the valve device 11a is connected to the option module M1 was described. However, a transmitter, which outputs a signal of "4 to 20 mA", or a contact switch or the like may be connected to the option module M1.

The option module M1 shown in FIG. 4B is one, to which, a field device (electromagnetic valve) 11b including a solenoid for driving, for example, an actuator is connected. The option module M1 shown in FIG. 4B includes an insulated circuit C20 (first circuit) and an external power source connection terminal T30. The insulated circuit C20 includes, for example, a photocoupler or a trance. The insulated circuit C20 enables the transmitting and receiving of signals between the terminal T11 and the terminal T21 and between the terminal T12 and the terminal T22 while electrically insulating the connection between the terminal T11 and the terminal T21 and electrically insulating the connection between the terminal T12 and the terminal T22. In detail, when the insulated circuit C20 includes a trance, the terminal T11 and the terminal T21 are electrically conductive in an alternate current to each other, but are electrically insulated in a direct current to each other. The terminal T12 and the terminal T22 are electrically conductive in an alternate current to each other, but are electrically insulated in a direct current to each other. The transmitting and receiving of signals between the terminal T11 and the terminal T21 and between the terminal T12 and the terminal T22 are executed.

The external power source connection terminal T30 is for connecting an external power source (the external power source connected to the external power source connection terminal T3 shown in FIGS. 2 and 3) between the terminal T12 and the insulated circuit C20. The external power source connection terminal T30 is provided for acquiring electrical power from the external power source to drive the solenoid provided in the field device 11b. The field device 11b is connected to the connection terminals TA and TB. Therefore, it may be said that the insulated circuit C20 provided in the option module M1 shown in FIG. 4B is for enabling the transmitting and receiving of the signals between the field device 11b and the connection lines L1 and L2 while electrically insulating the connection between the field device 11b and the connection lines L1 and L2.

Depending on the types of field devices 11 connected to the option module M1, there are still option modules M1, which do not include a microprocessor, other than the option module M1 shown in FIGS. 4A and 4B. For example, there is an option module including a circuit for processing signals transmitted and received between the terminal T11 and the terminal T21 and signals transmitted and received between the terminal T12 and the terminal T22. The circuit is, for example, an amplifier and is for amplifying the voltage or electrical current of analog signal or for attenuating the voltage or electrical current. If the signals are discrete signals, the circuit is for amplifying the voltage or electrical current of discrete signal or for attenuating the voltage or electrical current. The option module M1 may have a constitution, which does not include the insulated circuit such as a photocoupler or a trance insulating the connection between the field device 11 and the universal I/O module M2 and includes only a circuit for performing signal processing such as amplification and attenuation.

The option module M1 shown in FIG. 5A is one, to which a field device (transmitter) 11c for performing a communication in compliance with an industrial communication standard such as HART (registered trademark) and Foundation Fieldbus (registered trademark) is connected. A circuit C30, which includes a microprocessor C31 and insulated circuits C32 and C33, and a system power source connection terminal T40 are provided in the option module M1 shown in FIG. 5A.

The microprocessor C31 is connected to the terminals T11 to T14 and the insulated circuits C32 and C33. The microprocessor C31 performs a conversion process of communication protocol or the like for signals input from the terminals T11 and T12 (the signals from the field device 11c), and outputs the processed signals to the insulated circuit C32. The conversion process of communication protocol performed by the microprocessor C31 converts a communication protocol for communicating with the field device 11c into a communication protocol for communicating with the signal processing circuit 22 via the communication bus SB (refer to FIG. 6; the details of the signal processing circuit 22 will be described later), and vice versa.

The insulated circuit C32 includes, for example, a photocoupler. The insulated circuit C32 is a communication circuit which enables the transmitting and receiving of signals between the microprocessor C31 and the terminal T24 while electrically insulating the connection between the microprocessor C31 and the terminal T24. The insulated circuit C33 includes, for example, a trance, and is connected to the microprocessor C31 and the system power source connection terminal T40. The insulated circuit C33 is a DC/DC conversion circuit which converts the source voltage of system power source connected to the system power source connection terminal T40 (the system power source connected to the system power source connection terminal T4 shown in FIGS. 2 and 3) into a source voltage suitable for the microprocessor C31 while electrically insulating the connection between the microprocessor C31 and the system power source connection terminal T40.

The field device 11c is connected to the connection terminals TA and TB. Therefore, it may be said that the circuit C30 provided in the option module M1 shown in FIG. 5A is for performing the conversion process of communication protocol for the signals from the field device 11c and transmitting the processed signals to the communication bus SB while electrically insulating the connection between the field device 11c and the communication bus SB. The option module M1 shown in FIG. 5A performs the transmitting and receiving of the signals via the communication bus SB, but does not perform the transmitting and receiving of the signals via the connection lines L1 and L2.

The option module M1 shown in FIG. 5B is one, to which a thermocouple sensor 11d and a RJC (Reference Junction Compensation) 15 are connected. As with the case of the option module M1 shown in FIG. 5A, a circuit C30, which includes a microprocessor C31 and insulated circuits C32 and C33, and a system power source connection terminal T40 are provided in the option module M1 shown in FIG. 5B. The option module M1 shown in FIG. 5B may be different from that shown in FIG. 5A in a process performed by the microprocessor C31 as described hereinafter.

The microprocessor C31 is connected to terminals T11 to T14 and insulated circuits C32 and C33. The microprocessor C31 performs an analog-to-digital conversion process, a compensation process, and amplification process, and the like for signals input from the terminals T11 and T12 (the signals from the thermocouple sensor 11d), and outputs the processed signals to the insulated circuit C32. The microprocessor C31 performs the compensation process for compensating the signals from the thermocouple sensor 11d (temperature compensation) using signals from RJC 15 (the signals indicating the temperature around the thermocouple sensor 11d). The microprocessor C31 converts the signals, which have been subjected to the above-stated various processes, into signals, which are communicatable via the communication bus SB, and outputs the converted signals to the insulated circuit C32. The insulated circuits C32 and C33 are the same as the insulated circuits C32 and C33 shown in FIG. 5A, respectively.

The thermocouple sensor 11d is connected to connection terminals TA and TB. The RJC 15 is connected to connection terminals TC and TD. Therefore, it may be said that the circuit C30 provided in the option module M1 shown in FIG. 5B is for performing the compensation (temperature compensation) for the signals from the thermocouple sensor 11d and transmitting the compensated signals to the communication bus SB while electrically insulating the connection between the thermocouple sensor 11d and the communication bus SB. As with the case of the option module M1 shown in FIG. 5A, the option module M1 shown in FIG. 5B performs the transmitting and receiving of the signals via the communication bus SB, but does not perform the transmitting and receiving of the signals via the connection lines L1 and L2.

A universal I/O module M2 is detachably provided in a universal-slot SL2 provided in a base plate BP. The universal I/O module M2 is for performing a pre-determined process for signals input and output via the option module M1. The universal I/O module M2 has a cuboid shape and a greater external dimension than that of the option module M1.

The two universal I/O modules M2 attached to the base plate BP are same each other. Allowing the two universal I/O modules M2 to be attached to the base plate BP makes the universal I/O module M2 redundant and enhances the reliability. Contrary to the option module M1 which varies based on the types of the field devices 11, the universal I/O module M2 is constant regardless of the types of the field devices 11. Therefore, the universal I/O module M2 is not detached or changed except when the universal I/O module M2 fails, or the like.

Figure 6:
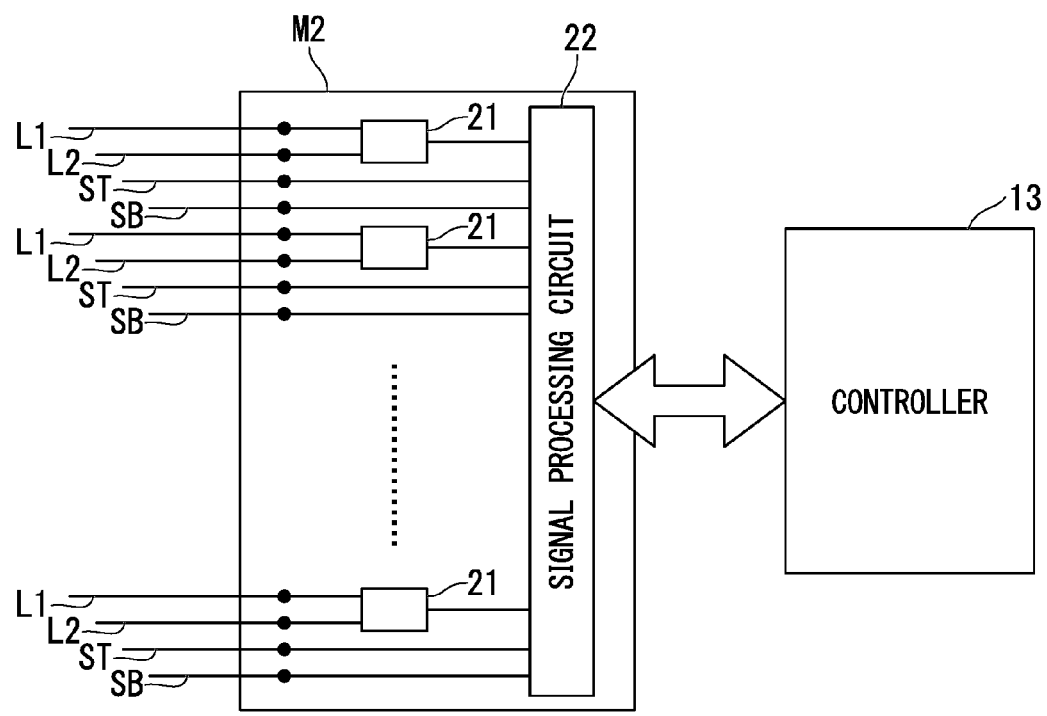
FIG. 6 is a block diagram showing the internal constitution of a universal I/O module used for the I/O module according to the embodiment of the present invention.

FIG. 6 is a block diagram showing the internal constitution of a universal I/O module used for the I/O module according to the embodiment of the present invention. As shown in FIG. 6, the universal I/O module M2 includes a plurality of universal circuits 21 and a signal processing circuit 22. The universal circuit 21 is capable of performing input and output of signals, which are input into and output from the field device 11. The field device 11 is connected to the universal circuit 21 via the option module M1.

Specifically, the universal circuit 21 is capable of performing the input of the analog signal from the field device 11, the output of the analog signal to the field device 11, the input of the discrete signal from the field device 11, and the output of the discrete signal to the field device 11. The process which the universal circuit 21 performs among the inputs and the outputs described above is pre-determined by, for example, the control of the controller 13. The universal circuit 21 is capable of selecting and performing any one of the inputs and the outputs described above.

The universal circuit 21 is provided so that the universal circuit 21 corresponds to the option slot SL1 provided in the base plate BP. In other words, the universal circuit 21 is provided so that the universal circuit 21 corresponds a connection terminal T1 (the connection terminal T1 indicates the set of four connection terminals TA, TB, TC, and TD shown in FIGS. 4A, 4B, 5A and 5B), which corresponds to the option slot SL1. Each universal circuit 21 is connected to the corresponding option slot SL1 via a pair of signal lines L1 and L2, and the signal processing circuit 22.

The signal processing circuit 22 is connected to the plurality of universal circuits 21, and the status line ST and the communication bus SB, which are connected to each option slot SL1. The signal processing circuit 22 processes signals transmitted to and received from the field device 11 via the universal circuit 21 or the communication bus SB. In addition, the signal processing circuit 22 communicates with the controller 13 to transmit signals from the field device 11 to the controller 13 and to receive signals for the field device 11, which are transmitted from the controller 13.

In addition, the signal processing circuit 22 identifies the type of the option module M1 attached to the option slot SL1. The signal processing circuit 22 identifies the type of the option module M1 attached to each option slot SL1 based on the voltage at the status line ST connected to each option slot SL1.

As described above, the identification resistance R provided in each option slot M1 is connected to the status line ST. Therefore, for example, when constant electrical current flows through the identification resistance R, a voltage drop depending on the resistance value of the identification resistance R occurs in the identification resistance R, the voltage drop appears at the status line ST. Thereby, the signal processing circuit 22 identifies the type of the option module M1 attached to the option slot SL1 based on the voltage at the status line ST. The identification results obtained from the signal processing circuit 22 are transmitted to the controller 13.

[Operations of I/O Module]

Next, the operations of the I/O module 12 described above will be described. Hereinafter, an example of operation in which control signals (analog signals, or discrete signals) for operating the valve device 11a shown in FIG. 4A as the field device 11 are transmitted from the controller 13 to the valve device 11a, and an example of operation in which signals (discrete signals) from the field device 11c shown in FIG. 5A are transmitted to the controller 13, will be described.

When the control signals for operating the valve device 11a shown in FIG. 4A is output from the controller 13, the control signals are received by the signal processing circuit 22 provided in the universal I/O module M2, and then, the control signals is output to any one of the universal circuits 21 (the universal circuit 21 corresponds to the connection terminal T1, to which the valve device 11a is connected). The universal circuit 21 is previously set by the control of the controller 13 so that the output of the control signals (analog signals or discrete signals) is possible.

The control signals output from the universal circuit 21 passes through a pair of signal lines L1 and L2, and then, are input to the option module M1 via the terminals T21 and T22. Then, the control signals are output from the terminals T11 and T12 to the outside of the option module M1 via a circuit C10 (the circuit including two connection lines) provided in the option module M1, and then, are input into the valve device 11a via the terminal T1 (the connection terminals TA and TB).

As described above, in the example shown in FIG. 4A, the connection terminal T1 (the connection terminals TA and TB), to which the valve device 11a as the field device 11 is connected, and the universal circuit 21, which corresponds to the connection terminal T1, are electrically connected by the circuit C10 provided in the option module M1. Therefore, the control signals for the valve device 11a output from the universal circuit 21 merely pass through the option module M1, and then, are input to the valve device 11a.

When the discrete signals are output from the field device 11c shown in FIG. 5A, first, the discrete signals are input to the connection terminal T1 (the connection terminals TA and TB) provided in the base plate BP. The discrete signals input to the connection terminals TA and TB are input to the option module M1 shown in FIG. 5A via the terminals T11 and T12, subjected to a protocol conversion process and the like by the microprocessor C31 provided in the option module M1, and then, output to the outside of option module M1 via the insulated circuit C32 and the terminal T24 in this order.

The communication bus SB is connected to the terminal T24 of the option module M1. Therefore, the signals output to the outside of option module M1 are input to the universal I/O module M2 via the communication bus SB, and then, are input into the signal processing circuit 22 without being input to the universal circuit 21. After the pre-determined process (for example, a protocol conversion process for transmitting the discrete signals to the controller 13) is performed for the discrete signals input to the signal processing circuit 22, the processed signals are transmitted to the controller 13.

As described above, in the example shown in FIG. 5A, the connection terminal T1 (the connection terminals TA and TB) to which the field device 11c is connected and the communication bus SB are electrically connected by the circuit C30 provided in the option module M1. Therefore, the discrete signals output from the field device 11c are subjected to the conversion process of communication protocol by the option module M1, and then, input to the signal processing circuit 22 provided in the universal I/O module M2 via the communication bus SB. Then, the input signals are subjected to a pre-determined signal process by the signal processing circuit 22, and transmitted to the controller 13.

As described above, in the present embodiment, the universal I/O module M2, which includes the plurality of the universal circuits 21 and the signal processing circuit 22, and the option module M1 for connecting the field device 11 to the universal I/O module M2 are detachably provided in the base plate BP including the plurality of connection terminals T1, to which the field device 11 is connected. Therefore, when the option module M1 depending on the field device 11 connected to the connection terminal T1 of the base plate BP is attached to the base plate BP, the field device 11 can be connected to the universal circuit 21 or the signal processing circuit 22 provided in the universal I/O module M2. Therefore, in the present embodiment, a greater variety of field devices than ever before can be connected.

In addition, in the present embodiment, the connection line for connecting the plurality of connection terminals T1, the option module M1 (option slot SL1), and the universal I/O module M2 (universal-slot SL2) is formed in the base plate BP. Therefore, since an operation for connecting them using connection lines and an operation for changing connection lines are unnecessary, maintenance is easy.

In addition, in the present embodiment, the signal processing circuit 22 provided in the universal I/O module M2 can identify the type of the option module M1 attached to the base plate BP based on the voltage of the identification resistance R via the status line ST, and transmit the identification results to the controller 13. Therefore, the installation state of the option module M1 can be understood without making an operator go to the site where the I/O module 12 is installed, thereby, the maintenance efficiency of the I/O module 12 can be enhanced.

[Variation of I/O Module]

Figure 7:
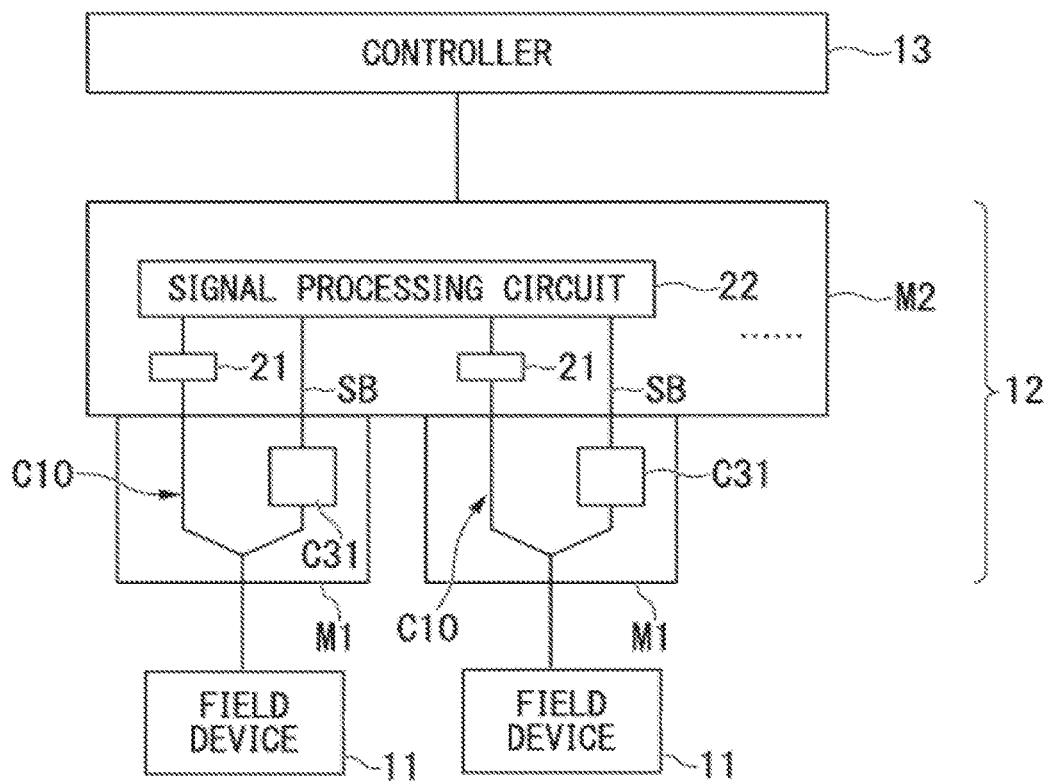
FIG. 7 is a block diagram simply showing a variation of the I/O module according to the embodiment of the present invention.

FIG. 7 is a block diagram simply showing a variation of the I/O module according to the embodiment of the present invention. In FIG. 7, blocks that correspond to those in FIGS. 4A, 4B, 5A and 5B are assigned the same reference numerals. The option modules M1 used for the I/O module 12 described in the above-stated embodiment include one option module in which a microprocessor is not installed and the field device 11 is connected to the universal circuit 21 (refer to FIGS. 4A and 4B), and another one in which a microprocessor is installed and the field device 11 is connected to the signal processing circuit 22 via the communication bus SB (refer to FIGS. 5A and 5B).

On the other hand, an option module M1 used for an I/O module 12 shown in FIG. 7 includes, so to speak, both the function of the option module M1 shown in FIGS. 4A and 4B and the function of the option module M1 shown in FIGS. 5A and 5B. In other words, in the option module M1 shown in FIG. 7, a microprocessor C31 is installed, the field device 11 is connected to the signal processing circuit 22 via the communication bus SB, and the field device 11 is connected to the universal circuit 21.

As shown in FIG. 7, the option module M1 used for the variation includes, for example, the circuit C10 shown in FIG. 4A and the microprocessor C31 shown in FIG. 5A. The insulated circuits C32 and C33 shown in FIG. 5A are omitted from FIG. 7. The option module M1 having such constitution enables the field device 11 configured to perform a hybrid communication such as HART (registered trademark) to be connected. The hybrid communication indicates a communication method in which analog signals and discrete signals can be communicated simultaneously by superimposing the discrete signals on the analog signals.

In other words, the option module M1 shown in FIG. 7 outputs the analog signals in the hybrid communication to the universal circuit 21 via the circuit C10, processes the discrete signals superimposed on the analog signals using the microprocessor C31 (for example, protocol conversion process), and transmits the processed signals the signal processing circuit 22 via the communication bus SB. Using such option module M1, it is unnecessary to provide an extra circuit (for example, a dividing circuit for dividing analog signals and discrete signals) in the universal I/O module M2, thereby, the universal I/O module M2 can be simplified. In addition, as the adventitious effect according to the present constitution, the load of the signal processing circuit 22 can be reduced by adding the circuit of the microprocessor C31.

When the dividing circuit or the like is provided in the universal I/O module M2 and the communication protocol used for the field device 11 varies based on the replacement of the field device 11 or the update of the field device 11, it is necessary to replace both the universal I/O module M2 and the option module M1. However, in the constitution shown in FIG. 7, it is unnecessary to replace the universal I/O module M2 and it is only necessary to replace the option module M1, or to change the program used in the microprocessor C31 of the option module M1, or the like.

The option module M1 having the constitution shown in FIG. 7 can identify the type of the field device 11 connected to the option module M1 by making the microprocessor C31 interpret signals (communication signals superimposed on analog signals) from the field device 11. By transmitting the identification results obtained from the microprocessor C31 to the controller 13 via the communication bus SB and the signal processing circuit 22, it is possible to automatically set the input and output operations of the universal circuit 21, to which the field device 11 is connected.

[Another Variations]

Figure 8:
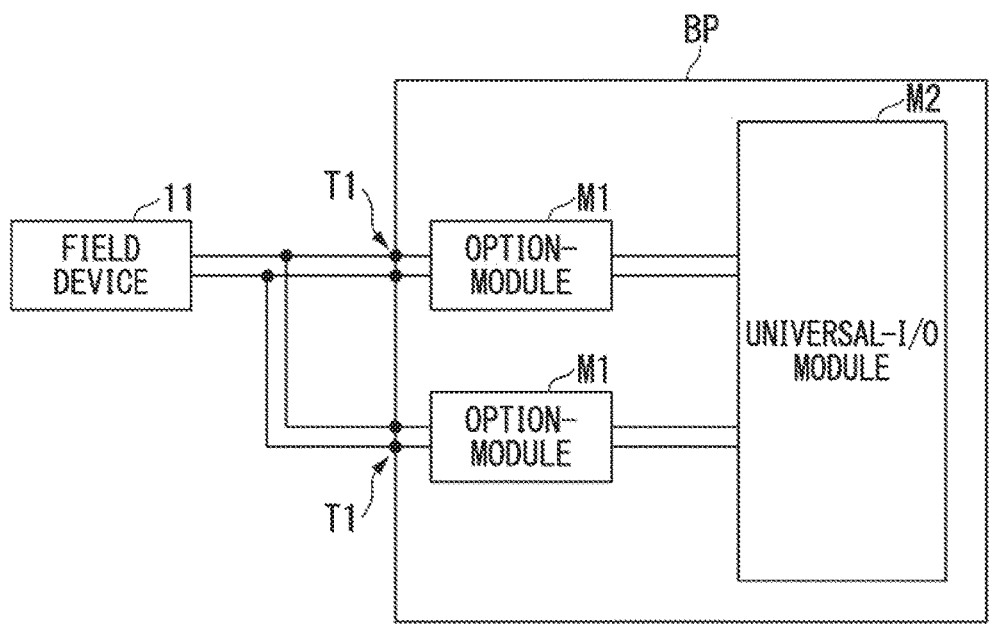
FIG. 8 is a diagram simply showing another variation of the I/O module according to the embodiment of the present invention.

FIG. 8 is a diagram simply showing another variation of the I/O module according to the embodiment of the present invention. As shown in FIG. 8, in the present variation, two identical option modules M1 are provided in parallel with respect to one field device 11 to make the option module M1 redundant. The two option modules M1 are attached to the base plate BP using the two option slots SL1 shown in FIG. 2. As described above, by making the option module M1 redundant, which is directly connected to the field device 11 and has a high failure risk, the reliability of the process control system 1 can be enhanced and the increase of the availability ratio of the process control system 1 can be expected. The parallel number of the option modules M1 may be equal to or greater than three.

As the communication bus SB for connecting the option slot SL1 (option module M1) and the universal-slot SL2 (universal I/O module M2), a bus laid on a plant where the process control system 1 shown in FIG. 1 is constructed, or the like, may be used. When, for example, the communication bus SB is in compliance with Foundation Fieldbus (registered trademark), the protocol conversion process performed by the microprocessor C31 (refer to FIGS. 5A and 5B) may be omitted.

Although the foregoing has been a description of the I/O module according to one embodiment of the present invention, the present invention is not limited to the embodiment described above, and can be freely modified within the scope of the present invention. For example, in the embodiment described above, the example in which the plurality of universal circuits 21 and the signal processing circuit 22 are provided in the universal I/O module M2 and the universal I/O module M2 is detachably provided in the base plate BP was described. However, the universal circuit 21 may be provided in the base plate BP, and only the signal processing circuit 22 may be detachably provided. Alternatively, both the universal circuit 21 and the signal processing circuit 22 may be provided in the base plate BP.

What is claimed is:

1. An input/output (I/O) module, comprising:
a base plate comprising a plurality of connection terminals, a plurality of field devices being electrically connectable to the connection terminals;
a plurality of universal circuits associated with the connection terminals, the universal circuits being provided on the base plate, and each of the plurality of universal circuits being configured to receive analog signals from respective one of the plurality of field devices, to output analog signals to respective one of the plurality of field devices, to receive discrete signals from respective one of the plurality of field devices, and to output discrete signals to respective one of the plurality of field devices; and
a plurality of option modules detachably provided in the base plate, each of the option modules being provided between respective one of the connection terminals and respective one of the universal circuits, the respective one of the connection terminals being associated with the respective one of the universal circuits, and each of the option modules comprising:
a first circuit configured to perform transmitting and receiving of signals between the respective one of the connection terminals and the respective one of the universal circuits; and
an identification circuit configured to allow for identifying the type of the option module;
wherein the base plate further comprises a signal processing circuit, the signal processing circuit is connected to the universal circuits and is configured to process signals transmitted to and received from the plurality of field devices;
wherein the base plate further comprises an identification line configured to connect the identification circuit provided in the attached option module and the signal processing circuit; and
wherein the signal processing circuit is configured to identify the type of option module attached to the base plate based on a signal at the identification line.

2. The I/O module according to claim 1, wherein the first circuit comprises a connection line electrically connecting the first connection terminal and the first universal circuit.

3. The I/O module according to claim 1, wherein the first circuit is configured to connect the first connection terminal and the first universal circuit to enable transmitting and receiving of signals between the first connection terminal and the first universal circuit while electrically insulating a connection between the first connection terminal and the first universal circuits.

4. The I/O module according to claim 3, wherein the first circuit comprises a photocoupler.

5. The I/O module according to claim 1, wherein the first circuit is configured to amplify or attenuate signals transmitted and received between the first connection terminal and the first universal circuit.

6. The I/O module according to claim 1,
wherein the option module is connected to the first universal circuit and the signal processing circuit.

7. The I/O module according to claim 6,
wherein the base plate further comprises a communication bus configured to connect the attached option module and the signal processing circuit;
wherein the option module is connected to the signal processing circuit via the communication bus; and
wherein the first circuit is configured to communicate with the signal processing circuit via the communication bus.

8. The I/O module according to claim 1,
wherein the universal circuits are installed on an universal-I/O module detachably provided in the base plate.

9. The I/O module according to claim 6,
wherein the signal processing circuit and the universal circuits are installed on an universal-I/O module detachably provided on the base plate.

10. The I/O module according to claim 1,
wherein at least two of the option modules attached to the base plate are the same as each other, and the at least two option modules are connected to one of the field devices to make the option modules redundant.

11. The I/O module according to claim 7,
wherein the first circuit comprises a first insulated circuit, a second insulated circuit, and a microprocessor connected to the connection terminals and the first and second insulated circuits.

12. The I/O module according to claim 11,
wherein the first insulated circuit is configured to connect the microprocessor and the signal processing circuit to enable transmitting and receiving of signals between the microprocessor and the signal processing circuit while electrically insulating a connection between the microprocessor and the signal processing circuit.

13. The I/O module according to claim 11,
wherein the second insulated circuit is configured to convert a source voltage of system power source into a source voltage suitable for the microprocessor while electrically insulating a connection between the microprocessor and the system power source.

14. The I/O module according to claim 12,
wherein the microprocessor is configured to perform a conversion process of communication protocol for signals input from the field device via the connection terminal, and to output the processed signals to the first insulated circuit.

15. The I/O module according to claim 12,
wherein the microprocessor is configured to perform at least one of an analog-to digital conversion process, a compensation process, and an amplification process for signals input from the field device via the connection terminal, and to output the processed signals into the first insulated circuit.

16. The I/O module according to claim 3,
wherein at least two of the option modules attached to the base plate are the same as each other, and the at least two option-modules are connected to one of the field devices to make the option modules redundant.

17. The I/O module according to claim 7, wherein at least two of the option modules attached to the base plate are the same as each other, and the at least two option modules are connected to one of the field devices to make the option modules redundant.

18. An input/output (I/O) module, comprising:
a base plate comprising a plurality of connection terminals, a plurality of field devices being electrically connectable to the connection terminals;
a plurality of universal circuits associated with the connection terminals and each of the plurality of universal circuits being configured to receive analog signals from respective one of the plurality of field devices, to output analog signals to respective one of the plurality of field devices, to receive discrete signals from respective one of the plurality of field devices, and to output discrete signals to respective one of the plurality of field devices; and
a plurality of option modules detachably provided in the base plate, each of the option modules being provided between respective one of the connection terminals and respective one of the universal circuits, the respective one of the connection terminals being associated with the respective one of the universal circuits, and each of the option modules comprising:
a first circuit configured to perform transmitting and receiving of signals between the respective one of the connection terminals and the respective one of the universal circuits; and
an identification circuit configured to allow for identifying the type of the option module;
wherein the base plate further comprises a signal processing circuit, the signal processing circuit is connected to the universal circuits and is configured to process signals transmitted to and received from the plurality of field devices;
wherein the base plate further comprises an identification line configured to connect the identification circuit provided in the attached option module and the signal processing circuit; and
wherein the signal processing circuit is configured to identify the type of option module attached to the base plate based on a signal at the identification line.

19. An input/output (I/O) module, comprising:
a base plate;
a plurality of universal circuits each of the plurality of universal circuits being associated with respective one of a plurality of field devices, each of the plurality of universal circuits being configured to receive signals from the respective one of the plurality of field devices and to output signals to the respective one of the plurality of field devices; and
a plurality of option modules detachably provided in the base plate, each of the plurality of option modules being provided between respective one of the plurality of field devices and respective one of the plurality of universal circuits and comprising:
a first circuit configured to perform transmitting and receiving of signals between the respective one of the plurality of field devices and the respective one of the plurality of universal circuits; and an identification circuit configured to allow for identifying the type of the option module;

wherein the base plate comprises a signal processing circuit, the signal processing circuit is connected to the universal circuits and is configured to process signals transmitted to and received from the plurality of field devices;

wherein the base plate further comprises an identification line configured to connect the identification circuit provided in the attached option module and the signal processing circuit; and wherein the signal processing circuit is configured to identify the type of option module attached to the base plate based on a signal at the identification line.

20. The I/O module according to claim 19, wherein the identification circuit further comprises an identification resistance provided in the option module; and wherein the signal processing circuit is configured to perform identification based on a voltage of the identification resistance.

21. The I/O module according to claim 19, wherein the identification circuit further comprises an identification resistance provided in the option module option-module; and wherein the signal processing circuit is configured to identify which resistance value the identification resistance has among a plurality of resistance values.

22. The I/O module according to claim 19, wherein the signal processing circuit is configured to transmit the identification result to a controller outside the I/O module.

23. The I/O module according to claim 20, wherein the signal processing circuit is configured to transmit the identification result to a controller outside the I/O module.

24. The I/O module according to claim 21, wherein the signal processing circuit is configured to transmit the identification result to a controller outside the I/O module.

25. A process control system, comprising:

an input/output (I/O) module, comprising:

a base plate;

a plurality of universal circuits, each of the plurality of universal circuits being associated with respective one of a plurality of field devices, each of the plurality of universal circuits being configured to receive signals from the respective one of the plurality of field devices and to output signals to the respective one of the plurality of field devices; and a plurality of option modules detachably provided in the base plate, each of the plurality of option modules being provided between respective one of the plurality of field devices and respective one of the plurality of universal circuits and comprising:

a first circuit configured to perform transmitting and receiving of signals between the respective one of the plurality of field devices and the respective one of the plurality of universal circuits; and an identification circuit configured to allow for identifying the type of the option module;

wherein the base plate comprises a signal processing circuit, the signal processing circuit is connected to the universal circuits and is configured to process signals transmitted to and received from the plurality of field devices;

wherein the base plate further comprises an identification line configured to connect the identification circuit provided in the attached option module and the signal processing circuit; and wherein the signal processing circuit is configured to identify the type of option module attached to the base plate based on a signal at the identification line.

26. The process control system according to claim 25, wherein the signal processing circuit is configured to identify the type of the option module using the identification circuit, and the process control system further comprises:

a controller configured to set the universal circuit to receive an input of analog signals, to receive an input of discrete signals, to output analog signals, or to output discrete signals based on the identification result.

27. The process control system according to claim 25, wherein the I/O module further comprises:

an identification resistance provided in the option module, the signal processing circuit being configured to perform identification based on a voltage of the identification resistance, and the process control system further comprises:

a controller configured to set the universal circuit to receive an input of analog signals, to receive an input of discrete signals, to output analog signals, or to output discrete signals based on the identification result.

28. The process control system according to claim 25, wherein the I/O module further comprises:

an identification resistance provided in the option module, the signal processing circuit being configured to identify which resistance value the identification resistance has among a plurality of resistance values, and the process control system further comprises:

a controller configured to set the universal circuit to receive an input of analog signals, to receive an input of discrete signals, to output analog signals, or to output discrete signals based on the identification result.

29. The process control system according to claim 25, wherein the signal processing circuit is configured to identify the type of the option module using the identification circuit, and the process control system further comprises:

a controller configured to previously set the universal circuit to receive an input of analog signals, to receive an input of discrete signals, to output analog signals, or to output discrete signals.

30. The process control system according to claim 25, wherein the I/O module further comprises:

an identification resistance provided in the option module, the signal processing circuit being configured to perform identification based on a voltage of the identification resistance, and the process control system further comprises:

a controller configured to previously set the universal circuit to receive an input of analog signals, to receive an input of discrete signals, to output analog signals, or to output discrete signals.

31. The process control system according to claim 25, wherein
the I/O module further comprises:
an identification resistance provided in the option module,
the signal processing circuit being configured to identify which resistance value the identification resistance has among a plurality of resistance values, and
the process control system further comprises:
a controller configured to previously set the universal circuit to receive an input of analog signals, to receive an input of discrete signals, to output analog signals, or to output discrete signals.

32. The process control system according to claim 25, wherein the process control system further comprises:
a controller,
wherein the signal processing circuit is configured to identify the type of the option module using the identification circuit and to transmit the identification result to the controller, and
the controller is configured to set the universal circuit to receive an input of analog signals, to receive an input of discrete signals, to output analog signals, or to output discrete signals based on the identification result.

33. The process control system according to claim 25, wherein
the process control system further comprises:
a controller,
the I/O module further comprises:
an identification resistance provided in the option module,
the signal processing circuit being configured to perform identification based on a voltage of the identification resistance and to transmit the identification result to the controller, and
the controller is configured to set the universal circuit to receive an input of analog signals, to receive an input of discrete signals, to output analog signals, or to output discrete signals based on the identification result.

34. The process control system according to claim 25, wherein
the process control system further comprises:
a controller,
the I/O module further comprises:
an identification resistance provided in the option module,
the signal processing circuit being configured to identify which a resistance value the identification resistance has among a plurality of resistance values and to transmit the identification result to the controller, and
the controller is configured to set the universal circuit to receive an input of analog signals, to receive an input of discrete signals, to output analog signals, or to output discrete signals based on the identification result.

* * * * *